R. S. CORMIER.
CAR FENDER.
APPLICATION FILED JAN. 9, 1911.

990,805.

Patented Apr. 25, 1911.

WITNESSES
C. K. Davis
M. E. Moore

INVENTOR
Reuben S. Cormier
by Attorney

UNITED STATES PATENT OFFICE.

REUBEN S. CORMIER, OF NEW BEDFORD, MASSACHUSETTS.

CAR-FENDER.

990,805.

Specification of Letters Patent.

Patented Apr. 25, 1911.

Application filed January 9, 1911. Serial No. 601,642.

*To all whom it may concern:*

Be it known that I, REUBEN S. CORMIER, a citizen of the United States, resident of New Bedford, in the county of Bristol and State of Massachusetts, have invented certain new and useful Improvements in Car-Fenders, of which the following is a specification.

My invention relates to improvements in car fenders and refers particularly to a fender for use upon surface or street cars.

The leading object of my invention is the provision of a fender which will be of the simplest, cheapest and most durable construction and which, when brought into contact with a person or object, will impart a soft or cushioning impact and also direct the person to one side, thus absolutely preventing shock or injury.

With this object in view my invention consists of a car fender embodying a combined yielding and rotating fender to provide a cushion and to move the person to one side.

The invention further consists of a car fender embodying novel features of construction and combination of parts substantially as disclosed herewith.

Figure 1:
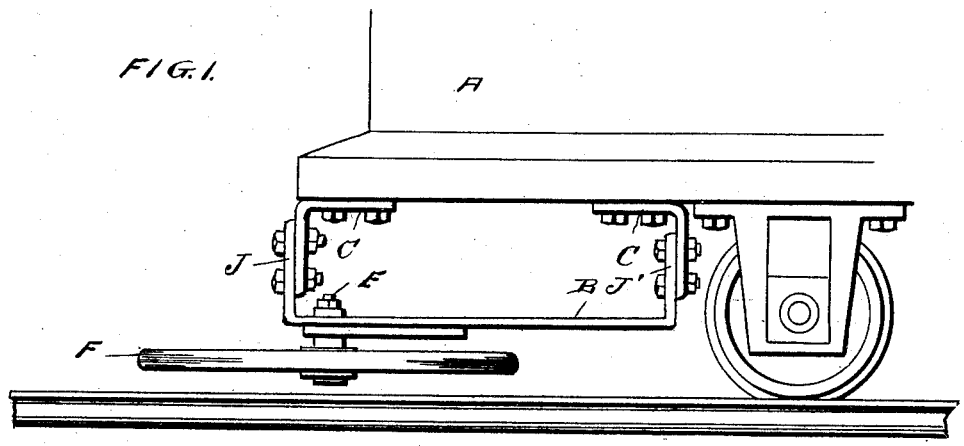
Figure 2:
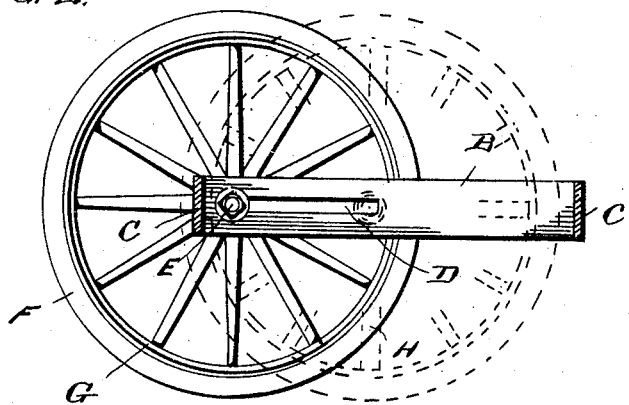
Figure 3:
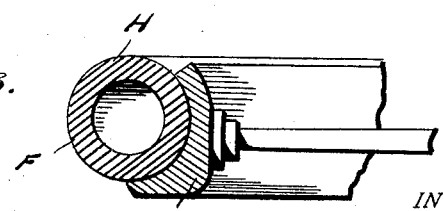

Figure 1 represents a side view of an end of a car equipped with my car fender. Fig. 2 represents a top plan view of the fender mechanism and showing in dotted lines the fender pushed under the car and out of use. Fig. 3 represents a detail view showing the construction of the wheel or contact member.

In the drawings, the letter A designates one end of a car to which my fender is applied, both ends of the car being similarly supplied and the fender being particularly useful upon surface cars.

The fender mechanism is of extremely simple construction and consists of the open rectangular frame B, having angular upper attaching ends C, and provided with the slot D, in which fits the stud E forming the short axle for the wheel or contacting member F, which wheel has the angle shaped rim G in which fits the rubber or elastic band or tire H. If desired the frame may be made in vertically adjustable members or sections J and J', which permits the structure to be adjusted vertically with reference to the track and car.

It will be understood that each end of the car is equipped with my fender, which consists of the pair of similar supporting brackets C, the horizontal arm of each of which brackets is secured to the car under the forward and rear platforms while the vertical arm of each bracket is connected to the vertical arms J and J' of the frame B, said arms J and J' being adjustable on the vertical arms of the brackets aforesaid with reference to the track, and this construction as a whole forming a longitudinal frame for the fender.

In use it will be understood that the wheel or contact member when brought against a person or object imparts a cushion or yielding impact and also turns and moves the person to one side, thus absolutely preventing injury or even shock to the object or person.

It will be noted that my fender can be applied at a very small cost; that it is very strong and is thoroughly efficient and practical from every point of view.

I claim:

The car fender herein shown and described, consisting of the pair of angle-shaped hangers having their horizontal arms secured to the car and having each a depending vertical arm, a longitudinally disposed member having vertical arms adjustably connected to the vertical arms of the said hangers for adjusting the member vertically with reference to the tracks, said longitudinally disposed member being provided with a longitudinal slot, a short axle clamped in and adjustable in said slot, a wheel having its hub on the short axle, and having a curved open rim and an elastic band in said open rim forming the contact portion of the wheel.

In testimony whereof I affix my signature, in presence of two witnesses.

REUBEN S. CORMIER.

Witnesses:
JOS. PELLETIER,
UNA R. MORIARTY.

---

Copies of this patent may be obtained for five cents each, by addressing the "Commissioner of Patents, Washington, D. C."